US005711920A

United States Patent [19]

Barford et al.

[11] Patent Number: 5,711,920

[45] Date of Patent: Jan. 27, 1998

[54] LAVATORY CLEANSING BLOCKS

[75] Inventors: Eric Dennis Barford, Bury St. Edmunds; Daniel John Jeffrey, Thetford; John Marshall, Norwich; Paul Anthony Raynor, Thetford, all of Great Britain

[73] Assignee: Jeyes Limited, Norfolk, Great Britain

[21] Appl. No.: 467,901

[22] Filed: Jun. 6, 1995

Related U.S. Application Data

[63] Continuation of Ser. No. 345,797, Nov. 22, 1994, abandoned, which is a continuation of Ser. No. 206,227, Mar. 7, 1994, abandoned, which is a continuation of Ser. No. 86,230, Jul. 6, 1993, abandoned, which is a continuation of Ser. No. 964,558, Oct. 21, 1992, abandoned, which is a continuation of Ser. No. 798,866, Nov. 22, 1991, abandoned, which is a continuation of Ser. No. 336,066, Apr. 11, 1989, abandoned.

[30] Foreign Application Priority Data

| | | | |
|---|---|---|---|
| Apr. 13, 1988 | [GB] | United Kingdom | 8808663 |
| Dec. 22, 1988 | [GB] | United Kingdom | 8829904 |

[51] Int. Cl.$^6$ .......... C09K 3/32

[52] U.S. Cl. .......... 422/282; 134/6; 252/94; 252/106; 252/186.33; 422/282

[58] Field of Search .......... 422/282, 937; 252/94, 106, 186.33, 186.35; 134/6

[56] References Cited

U.S. PATENT DOCUMENTS

| | | | |
|---|---|---|---|
| 4,269,723 | 5/1981 | Barford et al. . | |
| 4,472,187 | 9/1984 | Wojtowicz | 422/29 |
| 4,654,341 | 3/1987 | Nelson et al. . | |

FOREIGN PATENT DOCUMENTS

| | | |
|---|---|---|
| 0014979 | 9/1980 | European Pat. Off. . |
| 0122664 | 10/1984 | European Pat. Off. . |
| 0184416 | 6/1986 | European Pat. Off. . |
| 0206725 | 12/1986 | European Pat. Off. . |
| 1522919 | 8/1978 | United Kingdom . |
| 2021143 | 11/1979 | United Kingdom . |
| 2061996 | 5/1981 | United Kingdom . |
| 2178442 | 2/1987 | United Kingdom . |

OTHER PUBLICATIONS

Albright and Wilson Technical Data Sheet for NANSA HS/S Series (no firm date, published 1984 latest).

*Primary Examiner*—Timothy McMahon
*Attorney, Agent, or Firm*—Watson Cole Stevens Davis, P.L.L.C.

[57] ABSTRACT

A solid lavatory cleaning block is formed of a composition comprising a mixture of (A) a surface active component comprising one or more anionic surface active agents; (B) a chlorine release agent component consisting of one or more chlorinated cyanuric acid derivatives; and (C) a source of barium, cadmium, calcium, copper, iron, magnesium, manganese or nickel ions.

In order that the invention may be well understood the following examples are given by way of illustration only.

4 Claims, No Drawings

LAVATORY CLEANSING BLOCKS

This application is a Continuation of application Ser. No. 08/345,797, filed Nov. 22, 1994, which in turnis a Continuation of application Ser. No. 08/206,227, filed Mar. 7, 1994 which in turn is a Continuation of application Ser. No. 08/086,230, filed Jul. 6, 1993, which in turn is a Continuation of application Ser. No. 07/964,558, filed Oct. 21, 1992, which in turn is a Continuation of application Ser. No. 07/798,866, filed Nov. 22, 1991, which in turn is a Continuation of application Ser. No. 07/336,066, filed Apr. 11, 1989 all of which are now abandoned.

This invention is concerned with improvements in and relating to lavatory cleansing blocks.

In particular, the present invention is concerned with solid lavatory cleansing blocks intended to be brought into contact with the flush water of a lavatory or urinal whereby a part of the block is dissolved in the flush water to release active ingredients thereto for cleaning the lavatory or urinal. Thus, the solid block may be immersed in the water cistern of a lavatory or urinal, either as a free-standing block or as a block in a container or dispensing device adapted to deliver a more or less metered dose of liquid containing dissolved active material to the water in the cistern, so that water containing the active material is delivered to the lavatory bowl or urinal on flushing. Alternatively, the block may be used as a so-called 'rim block', i.e. held under the rim of a toilet bowl in a suitable holder.

One common class of component of such known lavatory cleansing blocks comprises one or more water-soluble surface active agents. Another desirable component of such blocks would be a halogen release agent, that is a compound which on contact with water releases hypohalous acid and/or hypohalite ions to the water, since these are powerful sanitising and cleansing agents. In principle, there would appear to be no problem in combining these two classes of ingredient in a single block. However, halogen release agents are, by their nature, powerful chemically reactive species, serving as halogenating or oxidising agents. Thus, in practice, we have found that halogen release agents (i) tend to react with surface active materials and/or (ii) tend, when moistened, to evolve gas thereby losing their activity and, in many cases, destroying the physical integrity of the cleansing block. This is particularly the case for free-standing blocks for immersion in the cistern of a lavatory but is also a marked disadvantage for solid lavatory cleansing composition blocks employed in other ways. Further, halogen release agents may attack component parts of lavatories, urinals or their cisterns.

A particularly useful class of chlorine release agents comprises the N-chlorinated cyanuric acid derivatives such as sodium dichloroisocyanurate and trichlorisocyanuric acid. We have found, however, it is just not practically possible to reproducibly and reliably incorporate such chlorine release agents in a lavatory cleansing block in amounts sufficient to give useful cleansing and/or sanitising, e.g. amounts of 10% by weight or more.

We have now found, in accordance with he present invention, that it is possible to include such chlorinated cyanuric acid derivatives in blocks by the simultaneous incorporation of a source of barium, cadmium, calcium, copper, iron, manganese, magnesium, or nickel ions.

According to the invention, therefore, there is provided a solid lavatory cleansing block formed of a composition comprising a mixture of (A) a surface active component comprising one or more anionic surface active agents; (B) a chlorine release agent component consisting of one or more chlorinated cyanuric acid derivative chlorine release agents; and (C) a source of barium, cadmium, calcium, copper, iron, magnesium manganese or nickel ions, preferably a source of cadmium, calcium, barium, iron or magnesium ions and especially a source of calcium or magnesium ions.

Suitable anionic surface active agents for use in the blocks of the invention include alkali metal, typical sodium, paraffin sulphonates; alkali metal alkyl sulphates and alkali metal alkyl aryl sulphonates, especially alkali metal benzene sulphonates. A typical example is sodium dodecyl benzene sulphonate which is a readily available material of commerce. The anionic surface active component of the block suitably forms from 5 to 80% by weight of the composition, and especially from 20 to 60% by weight thereof.

The chlorine release component of the block is an N-chlorinated cyanuric acid derivative, such as sodium dichloroisocyanurate or trichloroisocyanuric acid, especially the former.

The chlorine release component is suitably present in the blocks of the invention in an amount of from 2 to 75% by weight, preferably from 10 to 60% by weight, more preferably from 25 to 50% by weight.

The third essential component of the block of the invention is a source of specified metal ions, i.e. a water-soluble salt such as barium chloride, cadmium sulphate, calcium chloride, ferrous sulphate, ferric chloride, copper sulphate, manganese chloride, magnesium chloride, magnesium sulphate or nickel chloride. This is suitably present in the block in an amount of from 0.05 to 30% by weight.

Other things being equal, the in-use life of a block will generally increase with increasing metal salt content. It is a matter of simple routine test to establish the most appropriate level of salt for a particular formulation given a desired in-use life.

Other components may, and often will, be present in the blocks of the invention. Indeed, in certain cases such other compounds will be virtually essential. Thus, for example, in the case of blocks intended for free-standing blocks, a compound of lower solubility than the anionic surface active component and which assists in controlling the rate of dissolution of the block, is suitably present. The presence of such less soluble agents may also be of advantage when the composition is to be put up in a dispensing container though in such a case the design of the container may be such as to provide for only limited contact of water with the composition and thus the presence of a less soluble agent may well not be required.

As will be appreciated, any other ingredient present in the composition of the invention should be resistant to attack by the chlorine release agent. Thus, for example, most dyestuffs commonly employed in lavatory cleansing blocks to impart a pleasant colouration to the flush water are not sufficiently resistant to the chlorine release agents with the results that (a) the dyestuffs are decolourised or discoloured to an unpleasant colour and (b) available halogen, which would otherwise serve as a sanitizing agent, is lost. Similarly, most perfumes which are commonly employed in lavatory cleansing blocks are also subject to attack by the chlorine release agents.

Turning to specific classes of other ingredients which may be present in the blocks of the invention there may be firstly mentioned the compounds of reduced solubility as compared with the anionic surface active agents which may, indeed, may be virtually wholly insoluble in water. Such agents should be resistant to attack by the chlorine release component, both in the composition and in aqueous solutions produced by dissolution of the composition in use. It is a matter of simple experiment to determine whether any candidate is so resistant. Generally, the solubility control agent should be a saturated organic material or a highly chlorinated organic material. Examples of less soluble agents which may be employed include polyethylene waxes; fatty alcohols; fatty acids: low ethoxylates (e.g. containing up to 4 ethylene oxide units per mole) of fatty alcohols and alkylphenols; and paradichlorobenzene.

The amount of less soluble agent can vary within wide limits and, when present, it suitably forms up to 50% by weight of block, generally from 2 to 25% by weight thereof.

Certain of the less soluble agents noted above, the ethoxylated fatty alcohols and alkyl phenols, also possess surface active properties and thus may contribute to the overall cleansing effect of a composition containing them. In this connection it may be noted that other nonionic surfactants may be present in the blocks of the invention but that these should be present in lesser amounts than the anionic surface active agent component.

Other components which may be present in the blocks of the invention are inert fillers such as sodium sulphate. These are suitably present, in total, in amounts of upto 50% by weight of the composition, generally amounts of from 5 to 30% by weight thereof. Commercially available anionic surface active agents often contain appreciable amounts of filler or diluent, such as sodium sulphate, and such commercially available materials may be used in formulating blocks in accordance with the invention to provide both the desired surface active component and some or all of the filler.

Lavatory cleansing blocks commonly contain a germicide or preservative but this is not generally necessary in the case of the blocks of the invention since they already contain powerful germicides, namely the halogen release agents.

As noted above, it is not generally possible to incorporate dyestuffs or perfumes in the blocks of the invention. However, some insoluble pigments are resistant to the chlorine release agents and may be incorporated in the blocks of the invention to impart a colouration to the flush water. Examples of suitable pigments include copper phthalocyanine pigments which can be conveniently incorporated in the blocks of the invention in the forms of dispersions in suitable media. When such pigments are used in the blocks of the invention they are suitably present in amounts of up to 20% to by weight, preferably from 1 to 15%, more preferably 1 to 10% by weight.

The blocks of the invention are suitably formed by a compression process, especially an extrusion process comprising the steps of forming a mixture of the components of the composition, extruding this mixture into rod or bar form and then cutting the extruded rod or bar into appropriately sized pieces or blocks. (In this connection it may be noted that a free standing lavatory cleansing block suitably has a weight of from 20 to 150 gms, preferably from 30 to 100 gms).

When an extrusion process is employed the mixture to be extruded should contain up to 25% by weight, preferably from 3 to 15% by weight, of a liquid component or a solid component which is liquefied under extrusion conditions to act as a processing aid. In the case of the blocks of the invention this is conveniently provided by the use of a liquid less-soluble agent such as a lower ethoxylated alcohol or alkyl phenol; a higher alcohol, or chlorinated hydrocarbon.

In order that the invention may be well understood the following examples are given by way of illustration only.

EXAMPLES 1–3

Blocks having the following formulations where produced by extruding the mixture and cutting into blocks, which were stable when immersed in the cistern of a lavatory. In the examples all percentages are by weight.

EXAMPLE 1

| | |
|---|---|
| Sodium benzene sulphonate (80% active) | 54.5% |
| $MgSO_4.3H_2O$ | 7.5% |
| Sodium dichloro-isocyanurate | 30% |
| Alcohol ethoxylate 2EO | 7% |

EXAMPLE 2

| | |
|---|---|
| Sodium benzene sulphonate (85% active) | 42% |
| $MgSO_4.3H_2O$ | 10% |
| Sodium dichloro-isocyanurate | 40% |
| Alcohol ethoxylate 2EO | 8% |

EXAMPLE 3

| | |
|---|---|
| Sodium benzene sulphonate (85%) | 40% |
| $MgSO_4.3H_2O$ | 8% |
| Trichloroisocyanuric acid | 30% |
| Chlorinated paraffin (/50% chlorinated) | 7% |

EXAMPLE 4–10

Blocks having the following formulation where produced by extruding the mixture and cutting it into 70 gm blocks, which were stable when immersed in the cistern of a lavatory.

Formulation

| | |
|---|---|
| Sodium benzene sulphonate (85% active) | 53% wt |
| Metal Salt | 10% wt |
| Sodium dichloro-isocyanurate | 30% wt |
| Alcohol ethoxylate 2EO | 7% wt |

The metal salts used are listed below.

| Example | Metal Salt |
|---|---|
| 4 | Barium chloride |
| 5 | Cadmium sulphate |
| 6 | Ferrous sulphate |

We claim:

1. A solid lavatory cleansing block for positioning standing free or in a container in a cistern of a lavatory or urinal or in a container in the path of flushing water and formed of a composition consisting of a mixture of (A) a surface active component comprising one or more anionic surface active agents; (B) a chlorine release agent component consisting of one or more chlorinated cyanuric acid derivatives; and (C) a water-soluble salt having its anion selected from the group consisting of sulphate and chloride and its cation selected from the group consisting of barium, cadmium, calcium, copper, iron, magnesium, manganese and nickel.

2. The block as claimed in claim 1 in which component (C) is a source of barium, cadmium, calcium, iron or magnesium ions.

3. The block as claimed in claim 2 in which compound (C) is a source of calcium or magnesium ions.

4. The block as claimed in claim 1 in which the anionic surface active agent is an alkali metal paraffin sulphonate, alkali metal alkyl sulphate or alkali metal alkyl aryl sulphonate.

* * * * *